United States Patent [19]
Sasse

[11] 3,930,675
[45] Jan. 6, 1976

[54] STRAIN EQUALIZER FOR THERMALLY STRESSED PIPES

[75] Inventor: Joachim Sasse, Junkersdorf, Germany

[73] Assignee: Chemiebau Dr. A. Zieren GmbH & Co., Cologne, Germany

[22] Filed: Aug. 14, 1974

[21] Appl. No.: 497,270

Related U.S. Application Data

[63] Continuation of Ser. No. 213,095, Dec. 28, 1971, abandoned.

[30] Foreign Application Priority Data
Dec. 28, 1970  Germany.............................. 2064140

[52] U.S. Cl................................ 285/114; 285/227
[51] Int. Cl.² ......................................... F16L 51/02
[58] Field of Search ........... 285/227, 228, 226, 114; 403/50, 51

[56] References Cited
UNITED STATES PATENTS

| | | | |
|---|---|---|---|
| 2,335,478 | 11/1943 | Bergman.......................... | 285/226 X |
| 2,568,923 | 9/1951 | McNeary et al.................... | 285/228 |
| 2,960,354 | 11/1960 | Addie et al. ........................ | 285/228 |
| 3,659,879 | 5/1972 | Stalph................................ | 285/227 |

FOREIGN PATENTS OR APPLICATIONS

| | | | |
|---|---|---|---|
| 6,616,477 | 5/1967 | Netherlands........................ | 285/228 |
| 725,839 | 2/1932 | France............................... | 285/228 |
| 589,744 | 12/1933 | Germany ........................... | 285/227 |
| 977,923 | 12/1964 | United Kingdom................. | 285/227 |

*Primary Examiner*—Thomas F. Callaghan
*Attorney, Agent, or Firm*—Millen, Raptes & White

[57] ABSTRACT

An expansion compensator suitable for controlling the thermal expansion of a pipeline between fixedly disposed components, which comprises a linear pipeline extending between a pair of longitudinally spaced stress-susceptible pipeline components, a longitudinally spaced pair of linear strain equalizers interposed in the linear pipeline between and spaced inwardly from the components, and a pair of overlapping longitudinal anchors affixed to the linear pipeline, each of the anchors further overlapping one of the strain equalizers the combined distances between the outer end of each of the anchors and the adjacent component being substantially equal to the amount of overlap of the anchors.

6 Claims, 5 Drawing Figures

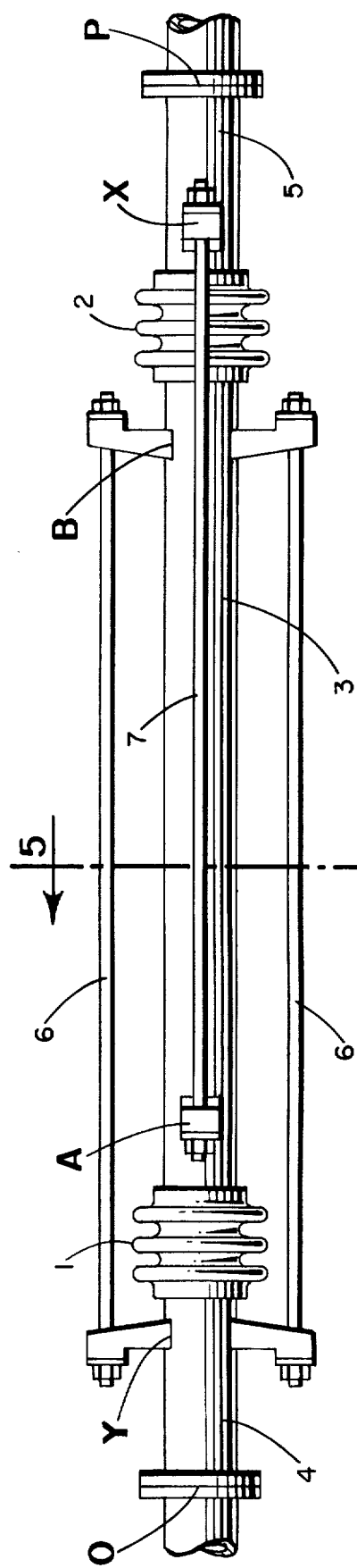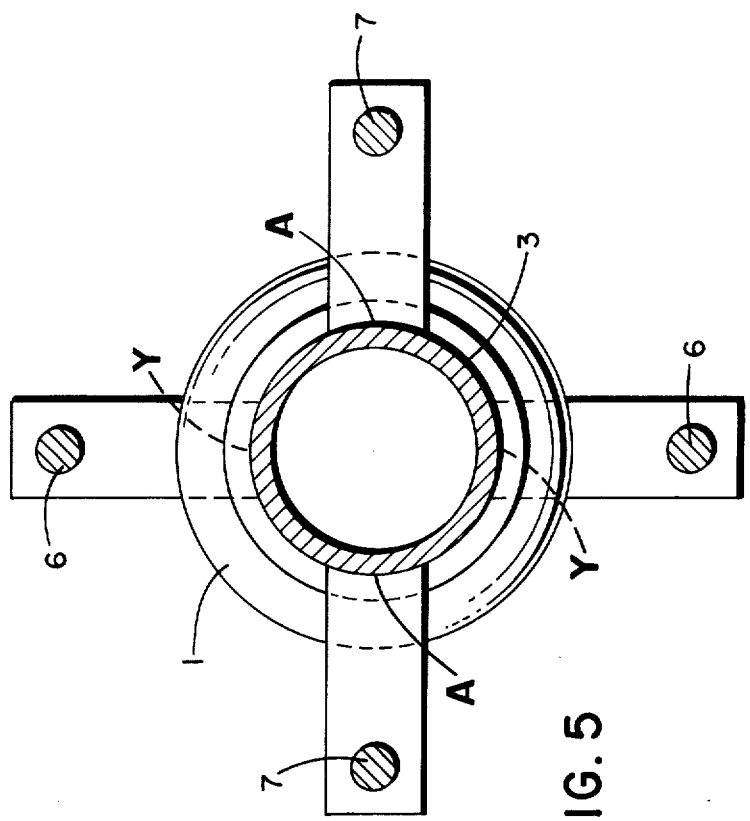
FIG. 3
FIG. 5

3,930,675

STRAIN EQUALIZER FOR THERMALLY STRESSED PIPES

This is a continuation, of application Ser. No. 213,095 filed Dec. 28, 1971 and now abandoned.

BACKGROUND OF THE INVENTION

Field of the Invention

This invention relates to linear expansion compensators. More particularly, this invention relates to linear expansion compensators suitable for controlling the thermal expansion of pipeline between fixedly disposed components thereon, such as angled joints, containers, blowers, supports and the like.

Description of the Prior Art

Pipelines are widely used in the chemical and transportation industries to convey fluids from place to place. In many cases, thermal expansion and contraction along a linear pipeline segment between a pair of fixed pipeline components, e.g., two containers, must be absorbed to prevent bending of the pipe and to minimize bearing pressures at the fixed components.

It is conventional to provide linear strain equalizers in pipelines used for the conveyance of hot fluids in order to absorb the thermal expansion of the pipeline, thereby avoiding bending of the pipe and reducing bearing pressures at fixed components which would otherwise result from thermal expansion of the pipe. However, simple solutions such as the above are generally suitable only for essentially straight pipelines between two fixed components; complicated and costly alternatives are needed when dealing with non-linear pipeline systems or those having a large number of fixed components interposed along the pipeline. An additional disadvantage of such prior art expansion compensators is that the use of strain equalizers of different elasticities results in differential stressing of the strain equalizers and consequently varying susceptibility to wear and tear, which complicates safety and maintenance upkeep.

Particularly when dealing with planar and three-dimensional pipeline systems between fixed component points, strains at such points are often unavoidable, and complicated calculations are needed to determine a pipeline installation in which such strains are reduced as much as possible.

SUMMARY OF THE INVENTION

Accordingly, it is an object of this invention to provide a linear expansion compensator which greatly minimizes or eliminates bearing pressures at fixed components in a pipeline.

Another object of this invention is to provide a simple and inexpensive device for minimizing bearing pressures at fixed components even in a planar or three-dimensional pipeline.

A further object of this invention is to provide linear expansion compensators in which strain equalizers are subjected to uniform stress.

An additional object of this invention is to provide linear expansion compensators which are adjustable for different temperature conditions.

Briefly, these and other objects are attained in one aspect of the invention by providing an expansion compensator suitable for controlling the thermal expansion of a pipeline between fixedly disposed components, which comprises a linear pipeline extending between a pair of longitudinally spaced, stress-susceptible pipeline components, a longitudinally spaced pair of linear strain equalizers interposed in the linear pipeline between and spaced inwardly from the components, and a pair of overlapping longitudinal anchors affixed to the linear pipeline, each of the anchors further overlapping one of the strain equalizers to fix the spacing of a portion of the linear pipeline.

More particularly, this is achieved by providing a linear expansion compensator for controlling the thermal expansion of a pipeline between components fixedly disposed therein so as to minimize bearing pressures at said components, comprising:

a. a linear pipeline extending between a first and a second longitudinally spaced, fixedly disposed, stress-susceptible pipeline component;

b. longitudinally spaced first and second linear strain equalizers interposed in said pipeline between and spaced inwardly from said components;

c. a first rigid longitudinal anchor rigidly secured at one end thereof to said pipeline at a first point thereon between said strain equalizers and nearer the first strain equalizer, and rigidly secured at the other end thereof to said pipeline at a second point thereon between the second strain equalizer nearer said second component and said second component;

d. a second rigid longitudinal anchor rigidly secured at one end thereof to said pipeline at a third point thereon between the first strain equalizer nearer said first component and said first component, and rigidly secured at the other end thereof to said pipeline at a fourth point thereon between said strain equalizers and nearer the second strain equalizer;

e. the distance between said second and third points being less than the sum of the distance between said first and second points plus the distance between said third and fourth points; and f. the distance between said first point and said fourth point along which distance said anchors longitudinally overlap being approximately equal to the sum of the distance between said first component and said third point plus the distance between said second component and said second point.

BRIEF DESCRIPTION OF THE DRAWINGS

These and other features of this invention will become more fully apparent to those skilled in the art by reference to the following detailed discussion of the invention, taken in conjunction with the annexed drawings, wherein like reference characters refer to like or corresponding parts in the different figures, and in which:

FIG. 3 is a side elevational view of one embodiment of the expansion compensator of the invention;

FIG. 5 is a cross section of the embodiment of FIG. 3 taken along the line 5—5 thereof.

DETAILED DESCRIPTION

Figure 1:
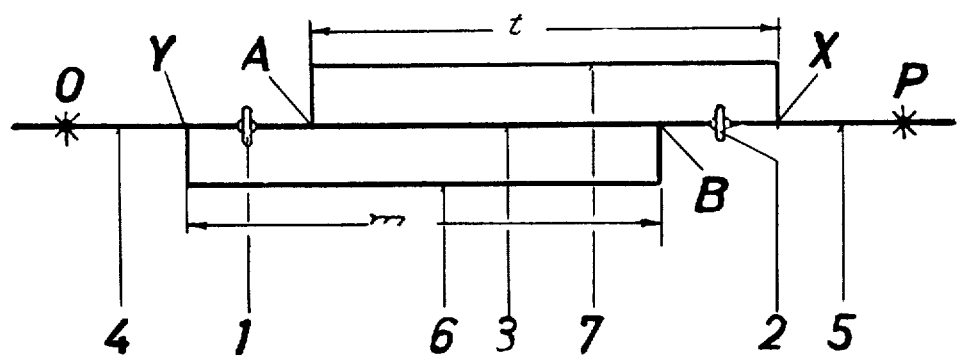
FIG. 1 schematically represents a linear pipeline between fixed points using the linear expansion compensator of the present invention.

The present invention provides an expansion compensator suitable for controlling the thermal expansion of a pipeline between fixedly disposed components, which comprises a linear pipeline extending between a pair of longitudinally spaced pair of linear strain equalizers interposed in the linear pipeline between and spaced inwardly from the components, and a pair of overlapping longitudinal anchors affixed to the linear pipeline, each of the anchors further overlapping one of the strain equalizers to fix the spacing of a portion of the linear pipeline.

The linear pipeline may be any enclosed fluid conduit means which is subject to longitudinal expansion and contraction due to temperature change. The longitudinally spaced fixed pipeline components can be essentially any pipeline component which intercepts the linear expansion and contraction of the pipe per se, such as a container, blower or other apparatus, a support, angled joint in the pipe, or the like.

As the linear strain equalizer component of this invention, any of those known in the art, such as bellows, are suitable for use in the present invention, the only requirements being that they absorb linear expansion and contraction of the pipe in response to temperature variations, and that a pair of such strain equalizers be interposed between two fixed pipeline components.

Affixed to the linear pipeline are a pair of overlapping longitudinal anchors, each of which further overlaps one of the strain equalizers to keep the spacing of this portion of the linear pipeline constant. Such anchors, as shown in Bergman U.S. Pat. No. 2,335,478 or McNeary et al U.S. Pat. No. 2,568,923, are long known in the art and may be attached to the pipeline by immobile clamps, lugs or short I-sections welded to the pipeline.

By overlapping two longitudinal anchors on a pipeline section between two strain equalizers, any thermal expansion of the overlapping pipeline length is absorbed by the equalizer overlapped by one of the longitudinal anchors, as well as by the other equalizer at the end of this pipeline section; the net result is a contraction which is equal to the thermal expansion of the length of pipe overlapped by the longitudinal anchors. The stronger the longitudinal contraction of this arrangement, the greater the overlapping of the longitudinal anchors on the pipeline section present between the equalizers. An additional advantage of this expansion compensator is that, due to the anchor overlapping, both or all equalizers are under equally strong stress. In this way, nonuniform stresses, frequently observed heretofore in prior art devices, and the resultant differential wear and tear on the equalizers, are avoided.

In accordance with a preferred embodiment of the invention, the overlapping of the longitudinal anchors is approximately equal (preferably not more than ± 10 % deviation) to the sum of the thermally stressed but unequalized (i.e., lengthwise unfixed) pipeline and apparatus sections between the fixed components. The longitudinal contraction of the device of this invention in response to thermal stresses makes it possible to omit fixation with respect to length of the parts of the pipeline system between the fixed points, without the resultant development of bearing stresses. The only requirement necessary to attain this is that the longitudinal contraction, determined by the degree of overlapping of the longitudinal anchors, be equal to the thermal expansion of the parts which are not fixed with respect to length, so that the total system exhibits an apparent indifference to temperature. Thermally stressed devices in the system, the thermal expansions of which cannot be compensated for, are neutralized with respect to the temperature by means of the expansion compensator of the present invention.

Preferably, a pipeline between n number of equalizers has no more than n-1 anchor overlaps, and the sum of all anchor overlaps is equal to the sum of all pipeline sections and apparatus parts between the fixed points which are not fixed with respect to length. Thus, it is possible to enclose a plurality of pipeline sections between equalizers within the pipeline system. If each linear piece of the pipeline system is equalized in accordance with the invention, the moments and tensions due to thermal expansion are so minimized that, even after extended operations, faults and damaged areas occurring as a result of localized bearing pressures are prevented.

In the case of planar and spatial pipeline systems, pipeline sections and/or devices which are not fixed with respect to length can also be provided, without the development of stress defects.

Preferably, the length of the longitudinal anchor overlap is adjustable. By varying the degree of anchor overlap, the amount of longitudinal contraction is changed. In this manner, it is possible to adapt to temperature differences in various segments of the system, especially between those parts of the system which are not fixed with respect to length and the overlapped pipeline sections, such that little or no forces or moments develop at the fixed points.

Referring briefly to the Drawings, the expansion compensator of this invention comprises at least two equalizers 1 and 2 in the pipeline 3. The distance t between a point A on the pipeline section between the two equalizers and a point X on the pipeline section proximate to one of the equalizers 2 is set by means of longitudinal anchor 7 between these points, and the distance m between a point B on the pipeline section between the two equalizers 1, 2 and a point Y on the pipeline section proximate to the other equalizer 1 is likewise set by means of longitudinal anchor 6 between these points, the spacing from point X to point Y being smaller than t + m.

In FIG. 1, a linear pipeline is illustrated between the fixed points O and P, e.g., two fixed container components in the pipeline system. Two strain equalizers 1,2 are interposed in this pipeline between and spaced inwardly from the fixed components. The pipeline section disposed between the equalizers 1, 2 is denoted by 3, and the pipeline sections between the fixed point O and the equalizer 1, as well as between the fixed point P and the equalizer 2 bear reference numerals 4 and 5, respectively. A longitudinal anchor 6 is attached to pipeline section 3 at B, this anchor overlapping strain equalizer 1 and being attached to the pipeline section 4 at Y. The longitudinal anchor 6 ensures that thermal expansions between points B and Y are absorbed by the equalizer 1, so that the distance m is kept constant. A second longitudinal anchor 7 is attached to the pipeline section 3 at A, this anchor overlapping strain equalizer 2 and being mounted to the pipeline section 5 at X. The longitudinal anchor 7 ensures a constant distance between points A and X in the same manner.

Since the pipe section between points A and B is spanned by both overlapping longitudinal anchors 6, 7, the thermal expansion of this pipe section is absorbed by the equalizer 1 as well as by the equalizer 2, i.e., in a dual manner. In this manner, any change in distance between the pipe points X and Y is equal to the change in spacing between the pipe points A and B, but opposite thereto, e.g., in the case of a thermal expansion of the distance AB by an amount $\Delta L$, the distance between point Y and point X is simultaneously reduced by $\Delta L$. Similarly, when the pipe section AB contracts by $\Delta L$ due to cooling, the pipe section XY expands by the same distance. Since pipe sections 4, 5 which are not fixed with respect to length act together along with the mutual overlap A–B of the longitudinal anchors 6, 7, the entire length of the pipeline between the fixed points O and P is independent of the temperature; in other words, due to compensating thermal expansions, no stress forces occur at the fixed points O and P. In the illustrated embodiment, the anchor overlap AB is arranged symmetrically between the equalizers 1, 2, ensuring an equally strong mechanical stress on both equalizers. When the length of the anchor 6 is shortened, with the length of anchor 7 remaining the same, e.g., by shifting the point of overlap B on the pipe section 3 in the direction toward the point A, then not only in contraction of the pipe section XY reduced due to temperature elevation, but also stress on the equalizer 1 is diminished while the stress on equalizer 2 remains the same. The pipeline sections 4, 5 which are not fixed with respect to length can thus include devices, the thermal expansion of which is permissible and/or which expansion can generally be compensated for only with difficulties in any other way.

Figure 2:
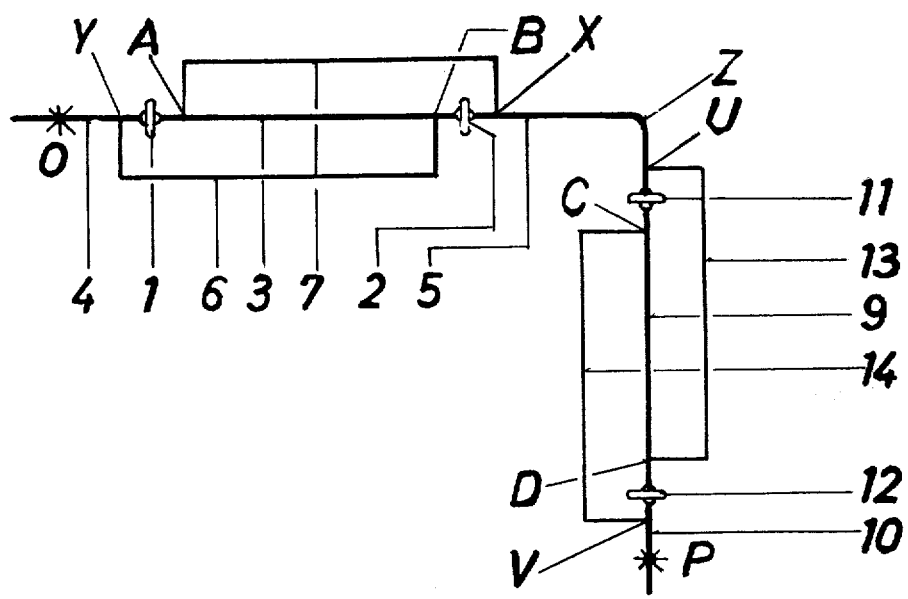
FIG. 2 schematically shows a planar pipeline between two fixed points using the expansion compensator of this invention.

FIG. 2 shows a planar, or two-dimensional, pipeline system using an equalizing device of this invention between the fixed points O and P. In a vertical pipe conduit between the unanchored, stress-susceptible angle point Z and the fixed point P, the pipe sections bear reference numerals 9, 10; the equalizers are 11, 12; and the longitudinal anchors are numbered 13, 14. As in FIG. 1, longitudinal contraction along anchor overlap AB in FIG. 2 is equal to the sum of the thermal expansions along unfixed pipe sections OY and XZ of the horizontal pipe conduit. In the same manner, the contraction along anchor overlap CD is equal to the sum of the expansion along unfixed pipe sections PV and UZ of the vertical pipe conduit. Thus, in spite of a thermal stress on the system, the pipe sections OZ and PZ remain constant, i.e., the position of the unfixed angular point Z in space is independent of the temperature of the pipeline. In this manner, torsional moments usually developing at fixed points O and P which are frequently the cause of faults, e.g., at pipe inlets into containers, are avoided.

As known in the art, anchors for fixing the length of a portion of a pipeline, as shown by the distance between A and X or B and Y of FIGS. 1, 2 and 3, comprise a pair of elongated rods or pipes on diametrically opposite sides of pipeline 3 and fixed to the pipeline by clamps, collars, welded lugs, etc. Linear strain equalizers, such as bellows 1 or 2, and their means of insertion in pipelines, like the anchors, are well known in the art.

In Applicant's invention, however, the section of the pipeline overlapped by the anchors is a rigid, integral section of the pipeline without a strain equalizer or equalizers therein. By balancing the amount of the overlap with the total of the distances between the outer end of each of the anchors and the adjacent component, better compensation is achieved.

Figure 4:
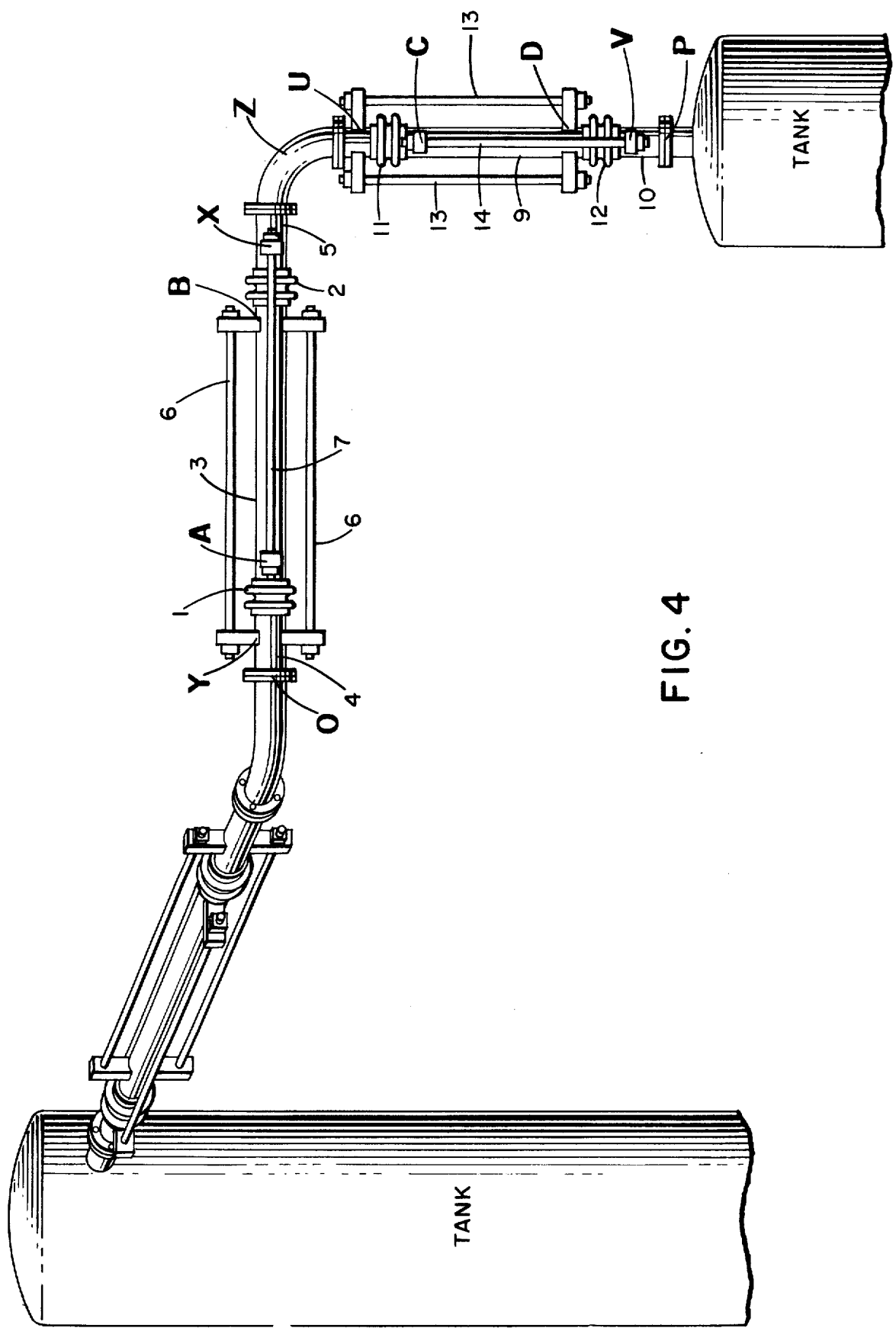
FIG. 4 is a schematic representation of a three-dimensional embodiment of the invention.

The invention is applicable in the same manner also to spatial or three-dimensional pipe systems, as shown in FIG. 4; in this connection, it is not necessary to dispose the strain equalizing device of this invention in each straight pipe section. The only requirement for neutralizing expansions and contractions is that they be mutually cancelled out in each of the three dimensions, so that no forces or moments are produced at the fixed points in spite of a possible and permissible shifting of the angle and branching points of the system.

From the foregoing description, one skilled in the art can easily ascertain the essential characteristics of this invention, and without departing from the spirit and scope thereof, can make various changes and modifications of the invention to adapt it to various usages and conditions. Consequently, the following detailed example is to be considered non-limitative and for purposes of illustration only.

EXAMPLE

A horizontal steel pipe line has a length of 14.2 m between two bends and a diameter of 1.32 m. In the line a first and a second steel bellows having a length of 0.18 and 0.36 m, respectively, are arranged in a mutual distance of 10.92 m. A first longitudinal anchor having the length L overlaps the first bellow and a second longitudinal anchor having the length $L_1$ overlaps the second bellows. The span overlapped by both anchors is approximately 3.5 m. The distances of the outer clampings of the anchors from the axis of the vertical pipe sections are 1.7 m so that the overlap span is approx. equal to the sum of these distances. The anchors consist of tubes with an external diameter of 42.4 mm in the ends of which threaded rods with a diameter of 36 mm are screwed in. These rods are bolted to short I-sections welded at the pipes.

The pipe line is used to convey gas the temperature of which changes from time to time up to $\Delta T=500°C$.

What is claimed is:

1. A device for compensating for the thermal expansion of a pipeline fixedly disposed between components so as to minimize bearing pressures at said components, comprising:
    a. at least one linear pipeline section extending between a first and a second longitudinally spaced, fixedly disposed, stress-susceptible pipeline component;
    b. longitudinally spaced first and second linear bellows-type strain equalizers interposed in said pipeline section between and spaced inwardly from said components, the portion of said pipeline between said longitudinally spaced first and second strain equalizers being continuous and rigid;
    c. a first rigid longitudinal anchor rigidly secured at one end thereof to said pipeline section at a first point thereon between said strain equalizers and nearer the first strain equalizer, and rigidly secured at the other end thereof to said pipeline section at a second point thereon between the second strain equalizer and said second component;
    d. a second rigid longitudinal anchor rigidly secured at one end thereof to said pipeline section at a third point thereon between the first strain equalizer and said first component, and rigidly secured at the other end thereof to said pipeline section at a fourth point thereon between said strain equalizers and nearer the second strain equalizer;
    e. the distance between said second and third points being less than the sum of the distance between said first and second points plus the distance between said third and fourth points; and f. the distance between said first point and said fourth point along which distance said anchors longitudinally overlap being approximately equal to the sum of the distance between said first component and said third point plus the distance between said second component and said second point.

2. The device according to claim 1, wherein the overlapping portion of said longitudinal anchors is symmetrically located between said strain equalizers.

3. The device according to claim 1, comprising a plurality of linear strain equalizers and longitudinal anchors, wherein the sum of the lengths of all longitudinal anchor overlaps equals the sum of the lengths of all longitudinally unanchored portions of said pipeline between fixed pipeline components.

4. The device according to claim 3, wherein the number of longitudinal anchor overlaps does not exceed a number which is one less than the number of linear strain equalizers.

5. The device according to claim 4, wherein said at least one section is included in a three-dimensional pipeline system.

6. The device according to claim 4, wherein said at least one section is included in a two-dimensional planar pipeline system.

* * * * *